US012494308B2

(12) United States Patent
Poterala

(10) Patent No.: US 12,494,308 B2
(45) Date of Patent: Dec. 9, 2025

(54) GRADED SPARK GAP DESIGN FOR INTERNALLY GAPPED SURGE ARRESTER

(71) Applicant: Hubbell Incorporated, Shelton, CT (US)

(72) Inventor: Stephen Franklin Poterala, Aiken, SC (US)

(73) Assignee: Hubbell Incorporated, Shelton, CT (US)

( * ) Notice: Subject to any disclaimer, the term of this patent is extended or adjusted under 35 U.S.C. 154(b) by 379 days.

(21) Appl. No.: 18/112,888

(22) Filed: Feb. 22, 2023

(65) Prior Publication Data

US 2023/0268103 A1 Aug. 24, 2023

Related U.S. Application Data

(60) Provisional application No. 63/313,050, filed on Feb. 23, 2022.

(51) Int. Cl.
*H01C 7/12* (2006.01)
*H01T 4/00* (2006.01)

(52) U.S. Cl.
CPC ................. *H01C 7/12* (2013.01); *H01T 4/00* (2013.01)

(58) Field of Classification Search
CPC .................................... H01C 7/12; H01T 4/00
See application file for complete search history.

(56) References Cited

U.S. PATENT DOCUMENTS

| | | | | |
|---|---|---|---|---|
| 3,859,569 | A | 1/1975 | Kresge | |
| 3,967,160 | A * | 6/1976 | Kresge | H01T 15/00 315/36 |
| 4,326,233 | A * | 4/1982 | Yanabu | H01T 1/16 315/36 |
| 5,004,715 | A | 4/1991 | Hakotani et al. | |
| 6,828,895 | B1 | 12/2004 | Huo et al. | |
| 9,088,153 | B2 * | 7/2015 | Huo | H05K 13/00 |
| 11,973,322 | B2 * | 4/2024 | Poterala | H01T 1/16 |
| 2004/0239472 | A1 * | 12/2004 | Huo | H01H 39/00 337/28 |
| 2014/0085764 | A1 | 3/2014 | Huo et al. | |
| 2017/0323700 | A1 | 11/2017 | Ryan et al. | |

OTHER PUBLICATIONS

PCT/US2023/013628 International Search Report and Written Opinion dated Jul. 5, 2023 (12 pages).

* cited by examiner

*Primary Examiner* — Kyung S Lee
(74) *Attorney, Agent, or Firm* — Michael Best & Friedrich LLP

(57) ABSTRACT

An arrester including a metal oxide varistor (MOV) disc and a spark gap assembly electrically connected in series with the MOV disc. The spark gap assembly includes a spark gap and a frequency-dependent grading capacitor electrically connected in parallel with the spark gap.

18 Claims, 11 Drawing Sheets

GRADED SPARK GAP DESIGN FOR INTERNALLY GAPPED SURGE ARRESTER

RELATED APPLICATIONS

This application claims the benefit of U.S. Provisional Patent Application No. 63/313,050, filed Feb. 23, 2022, the entire contents of which are hereby incorporated by reference.

FIELD

Embodiments relate to surge arresters.

SUMMARY

Surge arresters, which provide a current path from a conductor to electrical ground, offer power systems and related components protection against power surges caused by, for example, lightning strikes, electrical switching events, and/or other causes. Surge arrester designs may include a metal oxide varistor (MOV) stack made up of one or more MOV devices or discs, which are highly nonlinear ceramic semiconductors that switch from an insulating state during normal operation to a conductive state in the presence of a power surge. The resistance of the MOV stack drops during a power surge such that the arrester conducts the surge current to ground. Accordingly, during a power surge, a voltage increase on the conductor may be limited to a level that will not cause damage to the power system or components.

As described above, the MOV discs included in a surge arrester can protect equipment against short duration power surges caused by lightning or electrical switching. However, the MOV discs of the surge arrester may be ineffective in protecting against sustained overvoltage conditions that occur at typical line frequencies, such as 50-60 Hz. Sustained over voltages may result in overheating of the arrester, which increases conductivity of the MOV discs and, thus, more power dissipation. As a result, the arrester may reach a critical temperature at which thermal runaway and short-circuit faults may occur within the arrester. Short-circuit faults in an arrester may lead to severe power arcing and possibly expulsions of hot debris into the environment, creating hazardous conditions for nearby personnel and equipment.

A first aspect provides an arrester including a metal oxide varistor (MOV) disc and a spark gap assembly electrically connected in series with the MOV disc. The spark gap assembly includes a spark gap and a frequency-dependent grading capacitor electrically connected in parallel with the spark gap.

A second aspect provides an accessory device electrically connected in series with an arrester. The accessory device includes a spark gap assembly including a spark gap and a frequency-dependent grading capacitor electrically connected in parallel with the spark gap.

Other aspects of the invention will become apparent by consideration of the detailed description and accompanying drawings.

DETAILED DESCRIPTION

Figure 1:
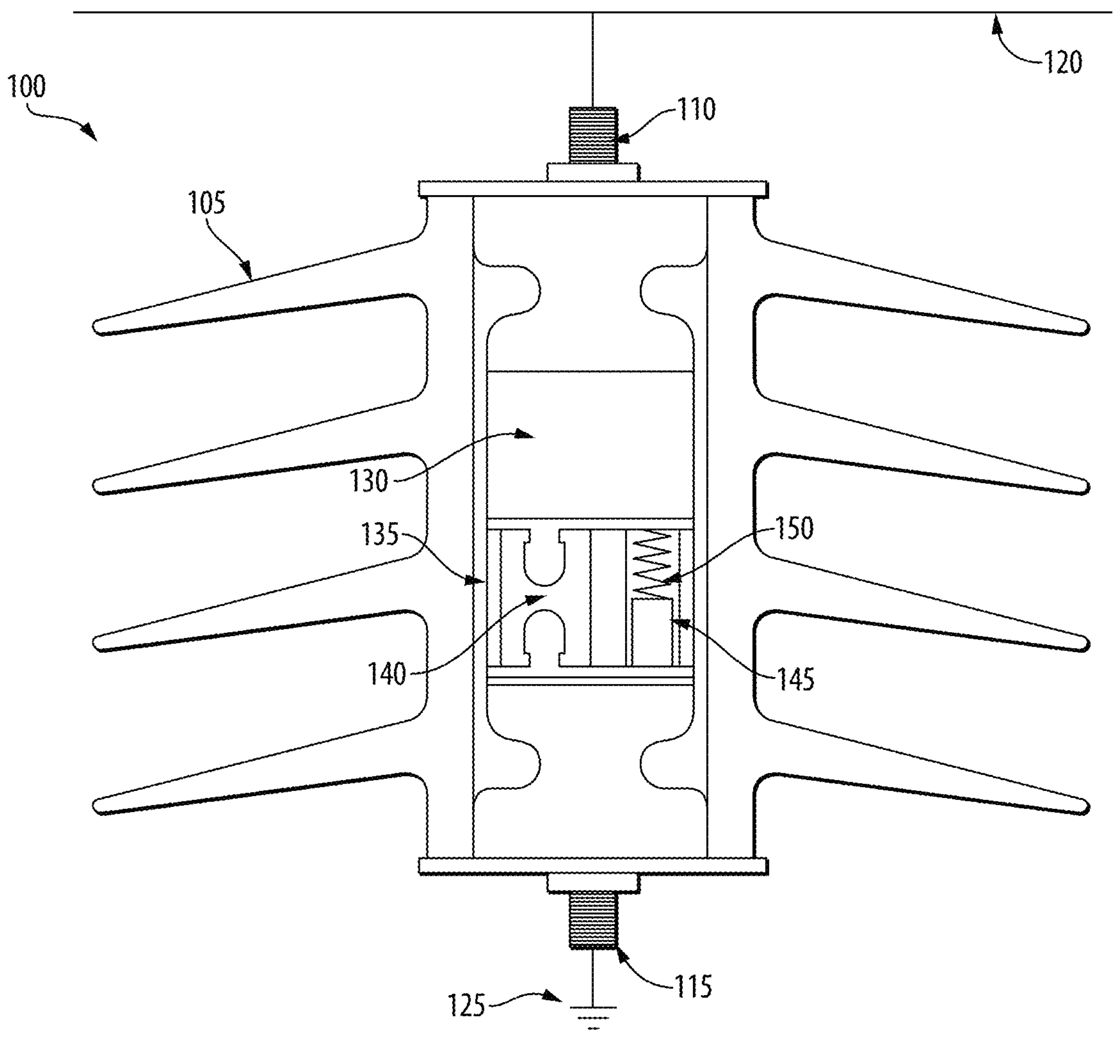
FIG. 1 illustrates an arrester according to some embodiments.

FIG. 1 illustrates an arrester, such as a surge arrester, 100 according to some embodiments of the application. The surge arrester is included in an electrical system, such as an electrical grid, a distribution network, or other power delivery system. The surge arrester 100 includes a housing 105, a first stud 110 extending from an upper portion of the housing 105, and a second stud 115 extending from a lower portion of the housing 105. The first stud 110 electrically connects the surge arrester 100 to a power system 120. The second stud 115 electrically connects the surge arrester 100 to ground 125. The housing 105 may be, for example, made of any suitable material, such as, but not limited to, ceramic, silicone rubber, and/or ethylene propylene diene monomer (EPDM) rubber.

The surge arrester 100 further includes one or more metal oxide varistor (MOV) discs 130 and a spark gap assembly 135. In some embodiments, the MOV disc 130 is comprised of predominantly zinc oxide (ZnO) and includes one or more additives, such as bismuth (Bi), manganese (Mn), cobalt (Co), nickel (Ni), antimony (Sb), tin (Sn), chromium (Cr), aluminum (Al), silver (Ag), and/or Boron (B).

Figure 2:
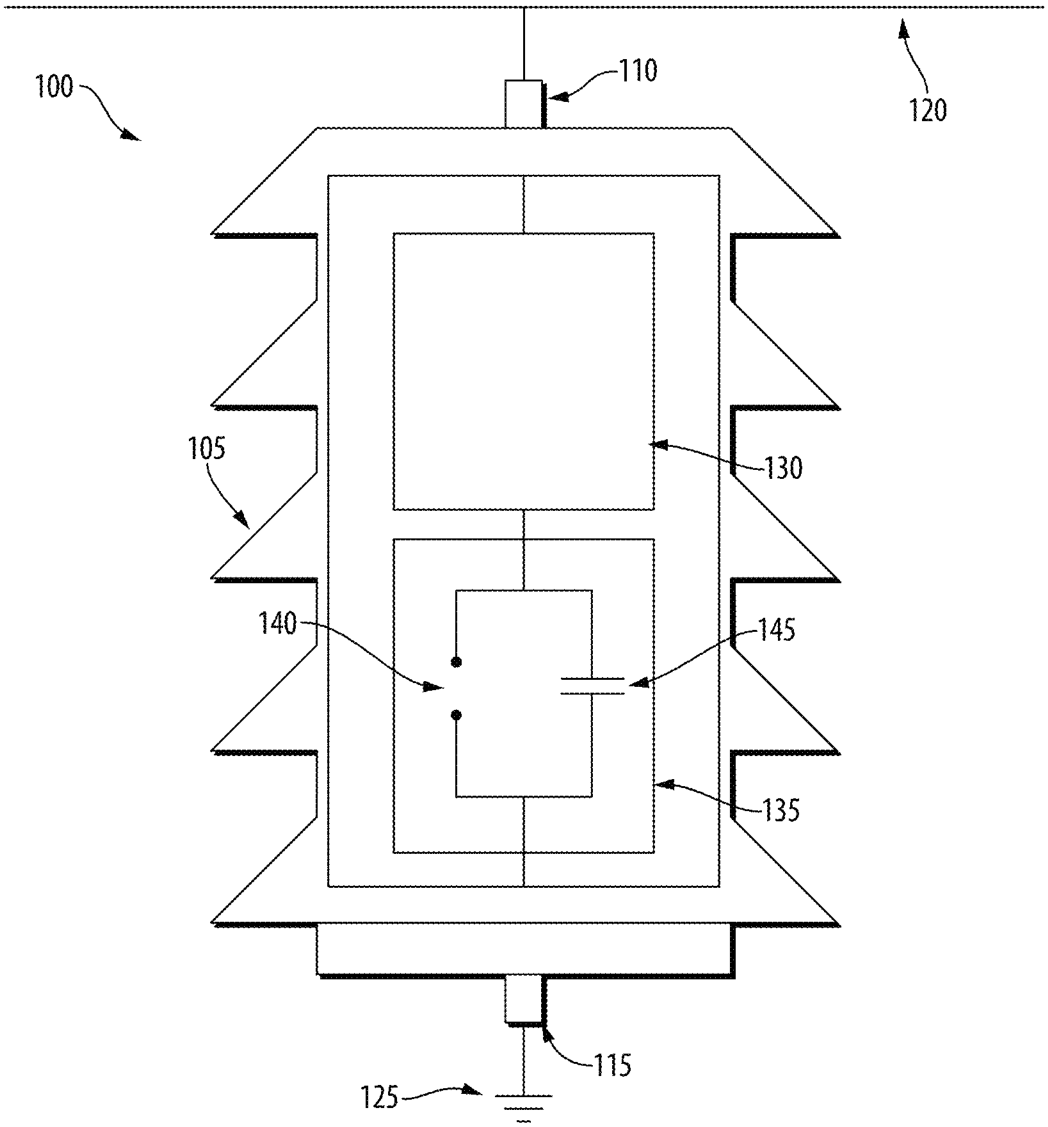
FIG. 2 illustrates a schematic diagram of the arrester of FIG. 1 according to some embodiments.

As shown in the circuit schematic illustrated in FIG. 2, the MOV disc(s) 130 are electrically connected in series with the spark gap assembly 135. The spark gap assembly 135 includes a spark gap 140 that is electrically connected in parallel with a grading capacitor 145. In some embodiments, the spark gap assembly 135 includes additional elements such as electrode plates, springs, and/or insulating materials. For example, FIG. 1 illustrates an embodiment in which the spark gap assembly includes a spring 150 that is electrically connected to grading capacitor 145.

The grading capacitor 145 is frequency dependent. That is, in operation, the electrical characteristics (e.g., capacitance, permittivity, etc.) of grading capacitor 145 are dependent on the frequency of the system 120 to which surge arrester 100 is connected, and thus, are dependent on the frequency of the voltage across grading capacitor 145. The grading capacitor 145 is designed such that the effective, or measured, capacitance of the grading capacitor 145 decreases as the frequency of the system 120 increases. In particular, the grading capacitor 145 is designed such that the effective, or measured, capacitance of the grading capacitor 145 decreases by at least 40% as the frequency of system 120 increases from 60 Hz to 500 kHz. Preferably, the grading capacitor 145 is designed such that effective, or measured, capacitance of the grading capacitor 145 decreases by at least 75% over the 60 Hz to 500 kHz frequency range of system 120.

In some embodiments, the grading capacitor 145 is designed such that effective, or measured, capacitance of the grading capacitor 145 decreases by at least 45% over the 60 Hz to 500 kHz frequency range of system 120. In some embodiments, the grading capacitor 145 is designed such that effective, or measured, capacitance of the grading capacitor 145 decreases by at least 50% over the 60 Hz to 500 kHz frequency range of system 120. In some embodiments, the grading capacitor 145 is designed such that effective, or measured, capacitance of the grading capacitor 145 decreases by at least 55% over the 60 Hz to 500 kHz frequency range of system 120. In some embodiments, the grading capacitor 145 is designed such that effective, or measured, capacitance of the grading capacitor 145 decreases by at least 60% over the 60 Hz to 500 kHz frequency range of system 120. In some embodiments, the grading capacitor 145 is designed such that effective, or measured, capacitance of the grading capacitor 145 decreases by at least 65% over the 60 Hz to 500 kHz frequency range of system 120. In some embodiments, the grading capacitor 145 is designed such that effective, or measured, capacitance of the grading capacitor 145 decreases by at least 70% over the 60 Hz to 500 kHz frequency range of system 120. The grading capacitor 145 may either be linear or nonlinear. A linear grading capacitor 145 has a capacitance that is not dependent on applied voltage. A nonlinear grading capacitor has a capacitance that changes with applied voltage.

To achieve the above-described capacitance decrease, the material(s) used to construct grading capacitor 145 may be chosen to be one or more capacitive materials that have a frequency-dependent permittivity. That is, the grading capacitor 145 is constructed from, or formed of, any material producing a suitable dielectric constant that is strongly enhanced at low system frequency. For example, the grading capacitor 145 may be formed of one or more of "soft," or donor-doped, ferroelectric ceramics, relaxor ferroelectric ceramics, and/or various composite materials (e.g., conductor-insulator composites) that exhibit enhanced low frequency permittivity due to space charge effects.

Figure 3:
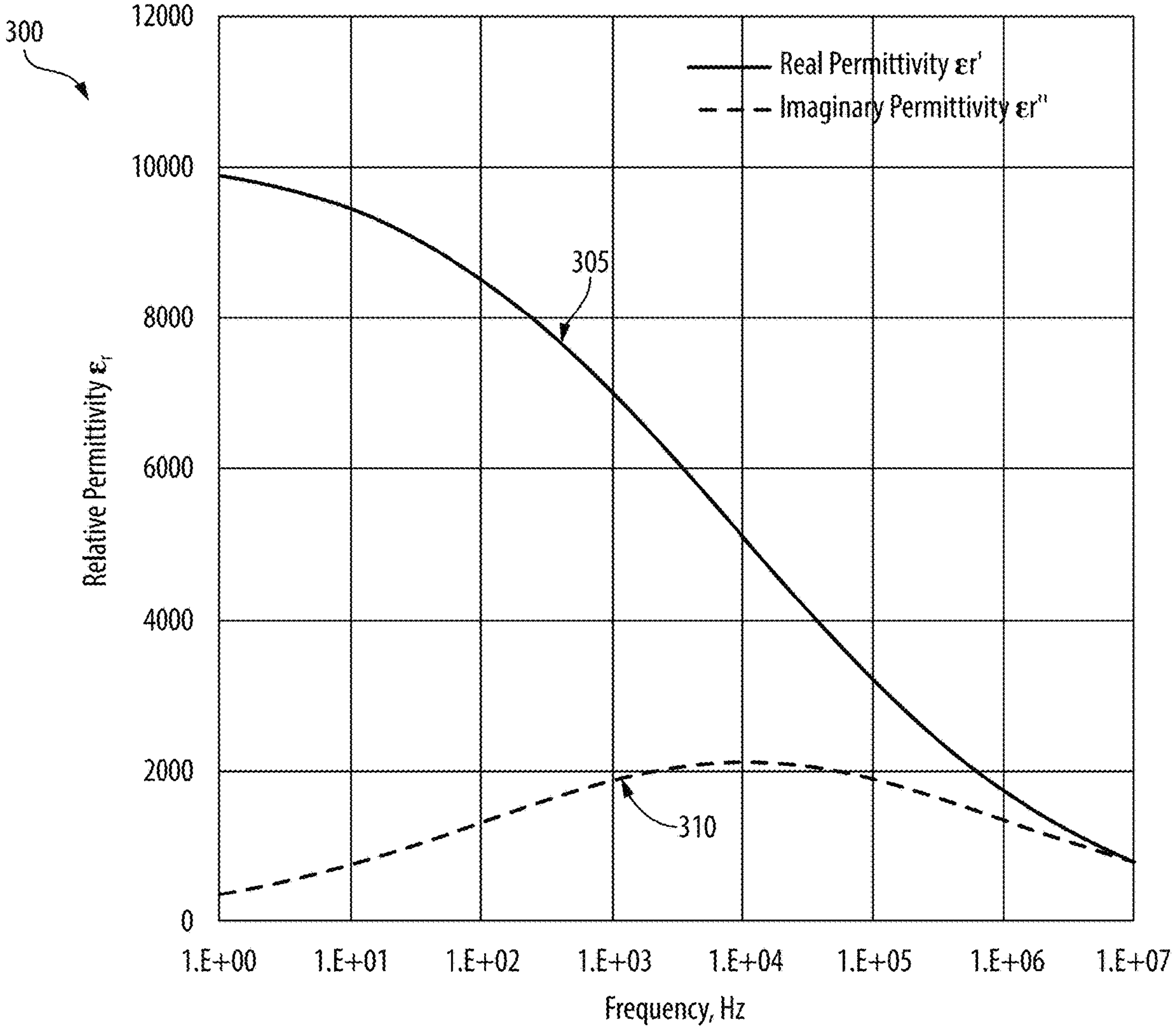
FIG. 3 illustrates a graph of permittivity vs. frequency according to some embodiments.

FIG. 3 illustrates an exemplary graph 300 of the target permittivity of grading capacitor 145 (real and imaginary) versus frequency. As shown, the real permittivity 305 of grading capacitor 145 is much greater than the imaginary permittivity 310 of grading capacitor 145 at lower system frequencies. The dielectric loss tangent of the material used to form grading capacitor 145 is the ratio between the material's imaginary permittivity and the material's real permittivity. In some embodiments, it is desirable for the grading capacitor 145 to have a dielectric loss tangent that is less than or equal to 15% at a system frequency of 50/60 Hz. However, in some embodiments, it is preferable for grading capacitor 145 to have an even lower dielectric loss tangent at a system frequency of 50/60 Hz. For example, it is especially desirable for the grading capacitor 145 to have dielectric loss tangent that is less than 5% at a system frequency of 50/60 Hz. In some embodiments, it is desirable for the grading capacitor 145 to have a dielectric loss tangent that is less than or equal to 10% at a system frequency of 50/60 Hz. In some embodiments, a higher dielectric loss tangent (50% or more) at the system frequency of 50/60 Hz is tolerable.

In addition to including a frequency-dependent grading capacitor 145, the spark gap assembly 135 is designed such that voltage sharing between the spark gap assembly and the MOV disc 130 is optimized. For example, the spark gap assembly 135 is designed to allow for a specific voltage sharing between the MOV disc 130 and the spark gap 140 included in spark gap assembly 145, as required by the application and desired performance of surge arrester 100. Furthermore, the spark gap assembly 135 is designed such that the impulse sparkover voltage of the surge arrester 100 is minimized at high frequencies (e.g., 500 kHz-1 MHz).

In some embodiments, the spark gap assembly 135 is designed such that the impedance of the grading capacitor 145 is coordinated with the series impedance of the MOV disc 130. In some embodiments, the impedance of the grading capacitor 145 is designed, or selected, to be a first percentage of the total impedance of surge arrester 100 at a 50/60 Hz maximum continuous operating voltage (MCOV). In such embodiments, the relative impedance of grading capacitor 145 increases to a second percentage, which is greater than the first percentage of the total impedance of surge arrester 100 during system voltage surges at frequencies between 30 kHz-1 MHz. For example, the impedance of grading capacitor 145 may be 20-50% of the total impedance of surge arrester 100 during operation at 50/60 Hz MCOV. However, at the same voltage but at higher frequencies between 30 kHz-1 MHz, the impedance of grading capacitor 145 increases to a value between 80-100% of the total impedance of surge arrester 100. That is, when the surge arrester 100 experiences a high frequency surge event occurring in system 120, the percentage of the surge arrester's total impedance that is attributed to grading capacitor 145 increases.

In some embodiments, the impedance of grading capacitor 145 may be less than the impedance of the MOV disc(s) 130 during operation at 50/60 Hz MCOV, and thus makes up less than 50% of the total impedance of surge arrester 100. During surges occurring at frequencies of 30 kHz-1 MHz, the impedance of gap assembly 135 is reduced to less than the impedance of the MOV disc(s) 130, owing to the frequency dependent capacitance of the grading capacitor 145. As a result, voltage sharing between the MOV disc(s) 130 and the gap assembly 135 is altered, such that the voltage across the MOV disc(s) 130 is reduced and the voltage across the gap assembly 135 is increased, causing earlier firing of the spark gap 140 at high frequency.

When compared to existing spark gap assemblies, the spark gap assembly 135 utilizes only a single grading capacitor 145 that is rated to withstand the gap sparkover voltage. The use of a single grading capacitor 145, as opposed to a plurality of grading circuit elements, reduces cost and size of the spark gap assembly 135. In addition, spark gap assemblies that include only a single grading capacitor may dissipate less heat than spark gap assemblies that include multiple circuit grading elements, particularly during surge events.

It should be understood that the embodiment of the surge arrester 100 illustrated by FIGS. 1-2 and described above is merely an example and does not limit the surge arrester 100 to the construction illustrated by FIGS. 1 and 2. For example, although illustrated as including a single MOV disc 130 and a single spark gap assembly 135, it should be understood that in some embodiments, the surge arrester 100 includes more than one MOV disc 130 and/or more than one spark gap assembly 135. In such embodiments, the total series impedance of the one or more spark gap assemblies 135 is coordinated with the total series impedance of the MOV disc(s) 130 such that the total series impedance of the one or more spark gap assemblies 135 is 20-50% of the total impedance of surge arrester 100 during operation at 50/60 Hz MCOV. Furthermore, in such embodiments, the total series impedance of the one or more spark gap assemblies 135 is 80-100% of the total impedance of surge arrester 100 during surge events at frequencies between 30 kHz-1 MHz.

Figure 4A:
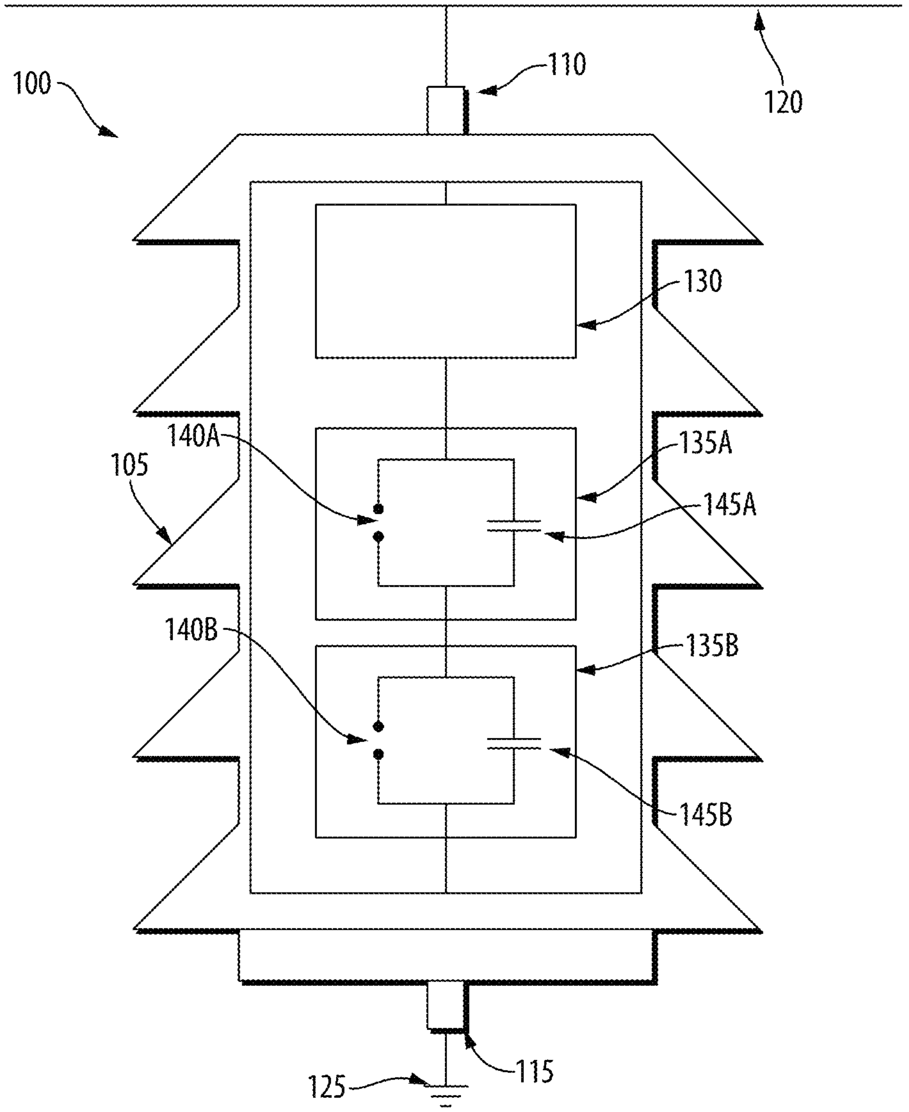
FIGS. 4A-4C illustrate schematic diagrams of various arrester embodiments.
Figure 4B:
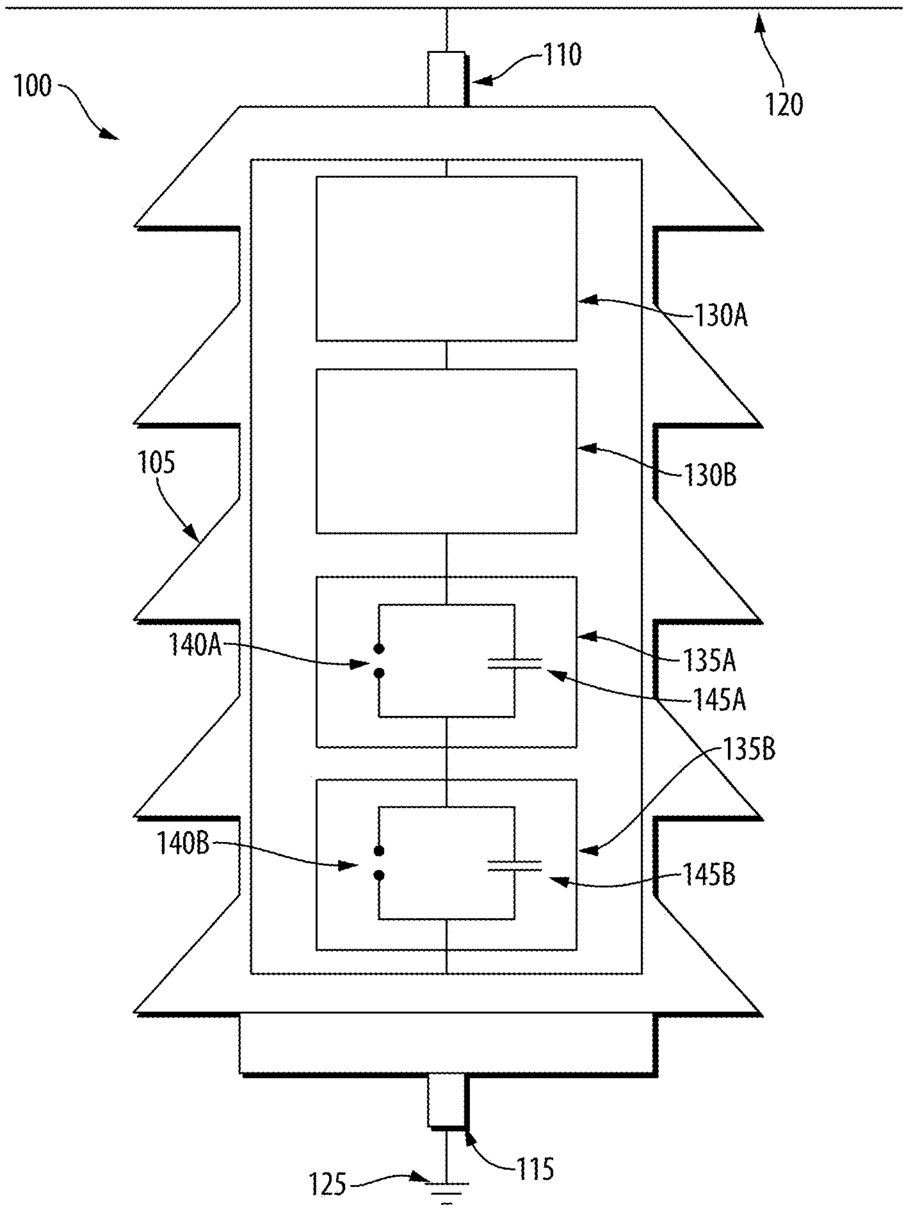
Figure 4C:
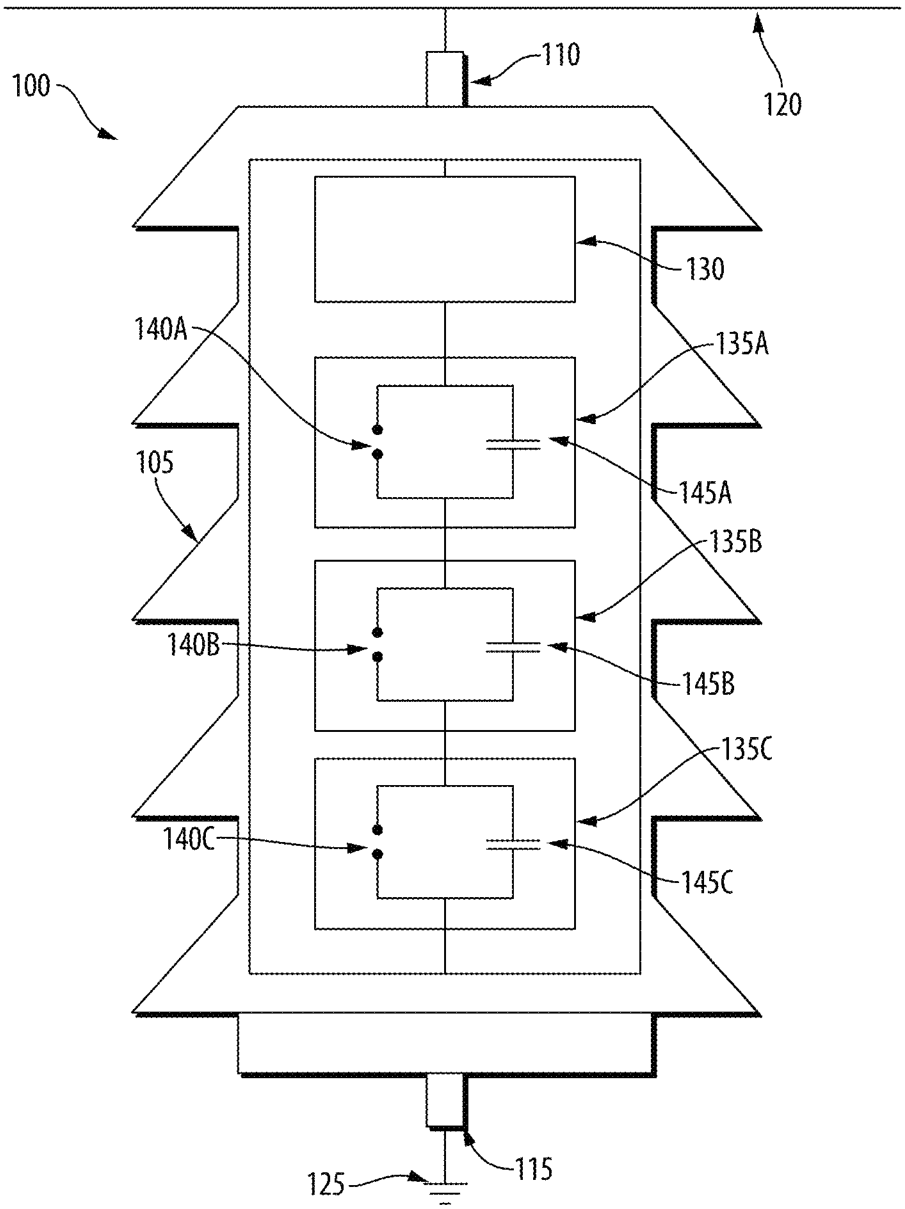

FIGS. 4A-4C illustrate various embodiments of surge arrester 100 in which the surge arrester 100 includes more than one MOV disc 130 and/or more than one spark gap assembly 135. It should be understood that the illustrated embodiments of FIGS. 4A-4C are merely provided as examples and do not limit the surge arrester 100 from including other combinations of series-connected MOV discs 130 and spark gap assemblies 135 not illustrated or described herein.

Moreover, it should be understood that the embodiment of the spark gap assembly 135 illustrated by FIGS. 1-2 and described above is merely an example and does not limit the spark gap assembly 135 to the construction illustrated by FIGS. 1 and 2. For example, although illustrated as including a single spark gap 140 electrically connected in parallel with a single grading capacitor 145, it should be understood that in some embodiments, the spark gap assembly 135 includes more than one spark gap 140 and/or more than one grading capacitor 145. In such embodiments, the total series impedance of the one or more grading capacitors 145 is coordinated with the total series impedance of the MOV disc(s) 130 such that the total series impedance of the one or more grading capacitors 145 is 20-50% of the total impedance of surge arrester 100 during operation at 50/60 Hz MCOV. Furthermore, in such embodiments, the total series impedance of the one or more grading capacitors 145 is 80-100% of the total impedance of surge arrester 100 during surge events at frequencies between 30 kHz-1 MHz.

Figure 5:
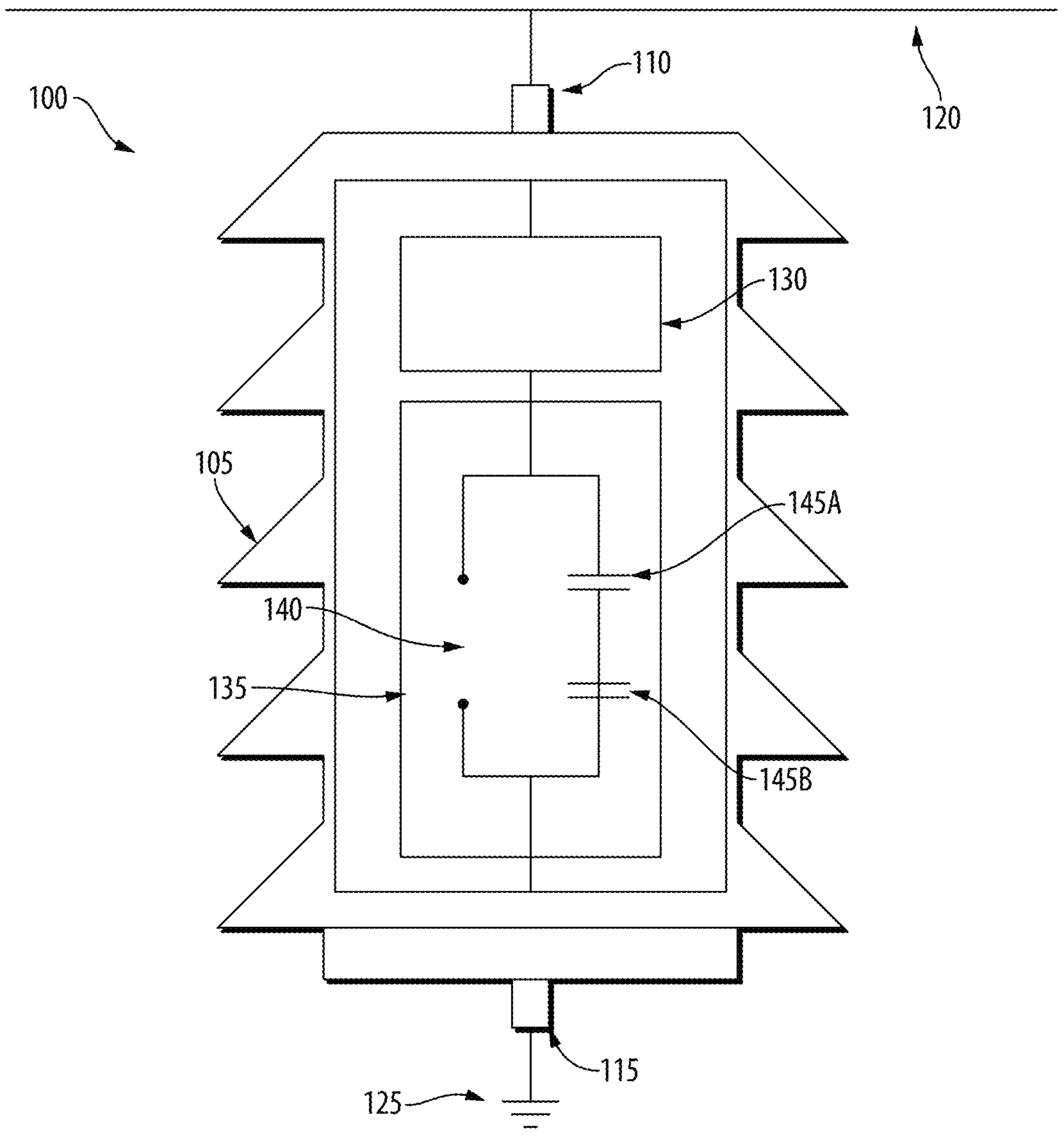
FIG. 5 illustrates a schematic diagram of an arrester according to some embodiments.

As an example, FIG. 5 illustrates an embodiment in which spark gap assembly 135 includes two series-connected grading capacitors 145A, 145B that are electrically connected in parallel with the spark gap 140. It should be understood that the illustrated embodiment of FIG. 5 is merely provided as an example and does not limit the spark gap assembly 135 from including other combinations of series-connected and/or parallel connected grading capacitors 145 electrically connected in parallel with a spark gap 140. In some embodiments, the spark gap assembly 135 also includes resistors or non-frequency-dependent capacitors in addition to at least one frequency dependent capacitor 145.

In some instances, it may be desirable to provide the protection offered by spark gap assembly 135 described herein to pre-existing and/or new surge arresters that do not include their own spark gap assemblies. Accordingly, in some embodiments, the spark gap assemblies described herein and/or illustrated in FIGS. 1-5 may be included in an accessory device that is configured to be electrically connected in series with surge arresters that do not include their own spark gap assemblies.

Figure 6:
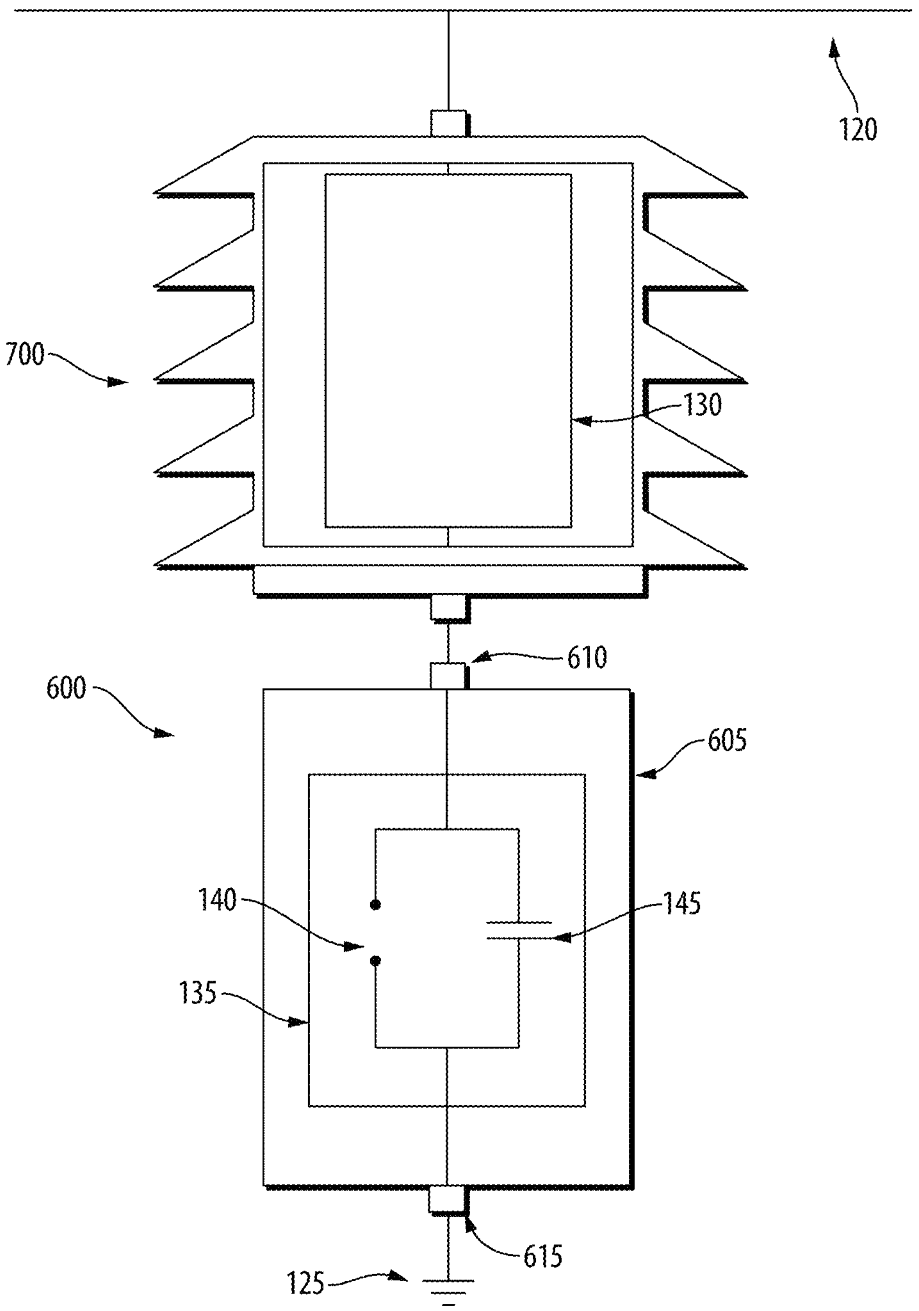
FIG. 6 illustrates a schematic diagram of an arrester accessory device according to some embodiments.

FIG. 6 illustrates an exemplary embodiment of a spark gap assembly accessory device 600. The accessory device 600 includes a housing 605, a first stud 610 extending from an upper portion of the housing 605, and a second stud 615 extending from a lower portion of the housing 605. The first stud 610 electrically connects the accessory device 600 to a surge arrester 700 that does not include its own spark gap assembly. For example, the surge arrester 700 may be a conventional MOV-based arrester that includes one or more resistive components, such as an MOV disc 130, but does not include a spark gap assembly. The second stud 615 electrically connects the accessory device 600 to ground 125. The housing 605 of the accessory device 600 may be, for example, made of any suitable material, such as, but not limited to, ceramic, glass, and/or nylon.

As shown, the accessory device 600 further includes a spark gap assembly 135. Accordingly, when the accessory device 600 is connected in series with the surge arrester 700, the impedance of the grading capacitor 145 included in spark gap assembly 135 is coordinated with the series impedance of the MOV disc(s) 130 included in arrester 700, as described above.

Figure 7:
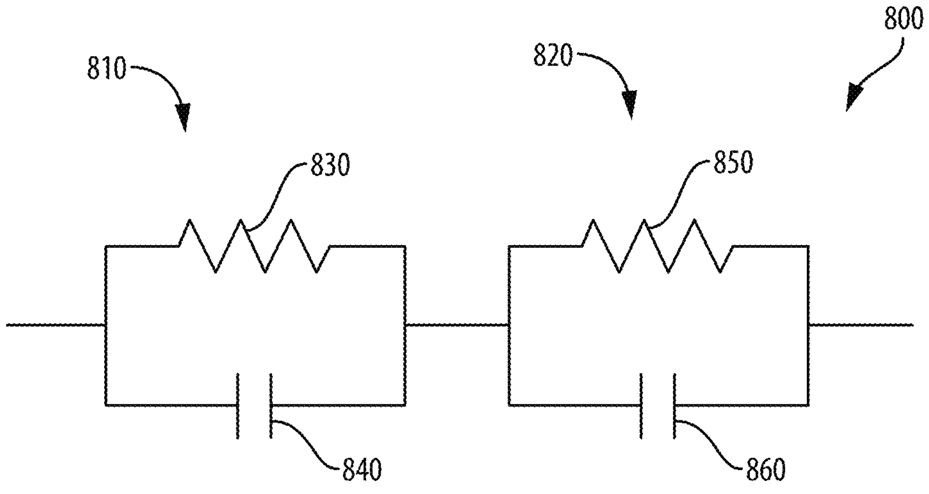
FIG. 7 illustrates a schematic diagram of a material used for a grading capacitor of the arrester of FIG. 1 according to some embodiments.
Figure 8:
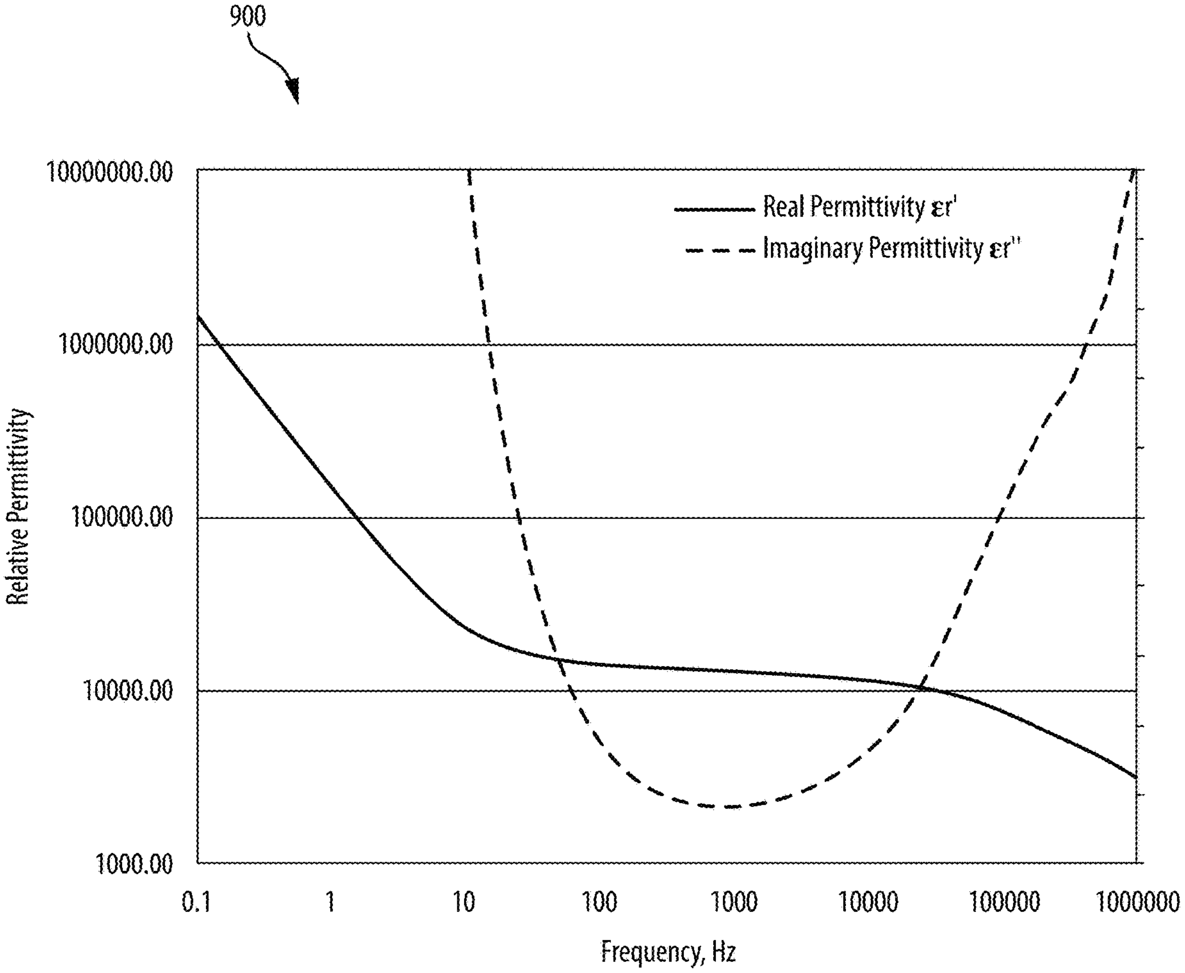
FIG. 8 illustrates a graph of permittivity vs. frequency according to some embodiments.
Figure 9:
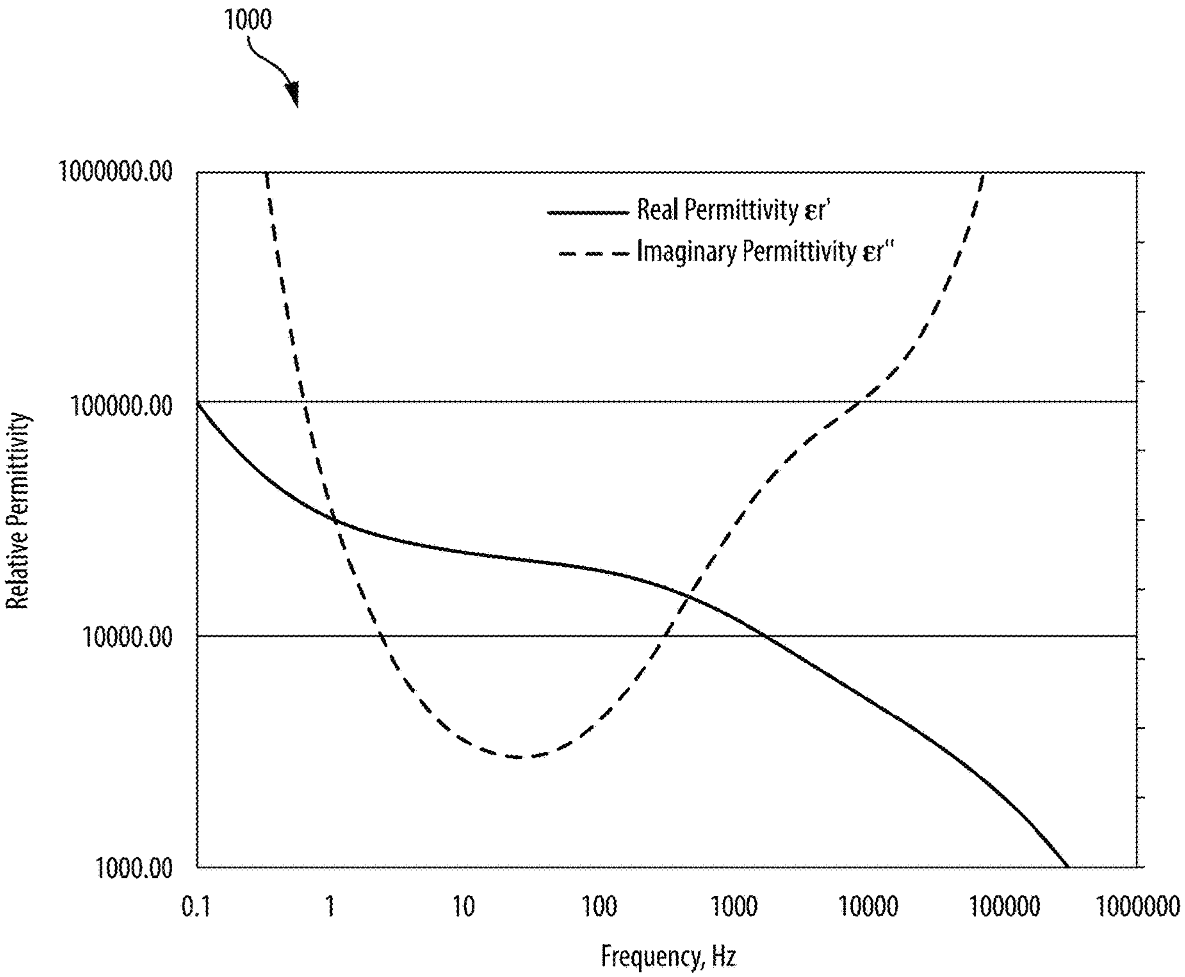
FIG. 9 illustrates a graph of permittivity vs. frequency according to some embodiments.

In some examples, is preferable for the grading capacitor to be formed of a dielectric ceramic that contains both capacitive and resistive microstructural elements when sintered in air. One example of this dielectric ceramic is perovskite ceramic with chemical formula $Cu_{0.75}Ca_{0.25}TiO_3$. Pervoskite ceramic naturally exhibits an inhomogeneous conductivity, with insulating grain boundaries and conductive grains, such that the material behaves as a complex R-C circuit. FIG. 7 illustrates a generic equivalent circuit diagram of the dielectric ceramic 800. The dielectric ceramic includes a grain circuit 810 connected in series with a grain boundary circuit 820. The grain circuit 810 includes a grain resistor 830 connected in parallel with a grain capacitor 840. The grain boundary circuit 820 includes a grain boundary resistor 850 connected in parallel with a grain boundary capacitor 860. In some embodiments, the grain capacitor 840 and/or the grain boundary capacitor 860 may be represented as constant phase elements (CPEs). In one example, the gap grading element is comprised of 90-99.5% $Cu_{0.75}Ca_{0.25}TiO_3$, with 0.5-10% of additional doping elements which are chosen to aid in microstructure formation or to modify the electrical properties of the ceramic. Two preferred dopants are Aluminum Oxide ($Al_2O_3$) and Silica ($SiO_2$). FIG. 8 illustrates an exemplary graph 900 of the target permittivity of a perovskite ceramic (used as the grading capacitor 145) having a structure $Cu_{0.75}Ca_{0.25}Ti_{0.97}O_3+0.03Al_2O_3$. FIG. 9 illustrates an example graph 1000 of the target permittivity of a perovskite ceramic (used as the grading capacitor 145) having a structure $Cu_{0.75}Ca_{0.25}TiO_3+0.03Al_2O_3+0.03SiO_2$.

Thus, the disclosure provides, among other things, surge arresters for protecting a power system against high frequency surge events. Various features and advantages of the disclosure are set forth in the following claims.

What is claimed is:

1. An arrester comprising:

a metal oxide varistor (MOV) disc; and a spark gap assembly electrically connected in series with the MOV disc, the spark gap assembly including, a spark gap; and a frequency-dependent grading capacitor electrically connected in parallel with the spark gap, wherein a capacitance of the frequency-dependent grading capacitor decreases as a frequency of a voltage across the frequency-dependent grading capacitor increases.

2. The arrester of claim 1, wherein the capacitance of the frequency-dependent grading capacitor decreases by at least 40% when the frequency of the voltage across the frequency-dependent capacitor increases from 60 Hertz (Hz) to 500 KHz.

3. The arrester of claim 1, wherein the capacitance of the frequency-dependent grading capacitor decreases by at least 75% when the frequency of the voltage across the frequency-dependent capacitor increases from 60 Hertz (Hz) to 500 kHz.

4. The arrester of claim 1, wherein the frequency-dependent grading capacitor is constructed from a material including at least one of a donor-doped ferroelectric ceramic, a relaxor ferroelectric ceramic, and an insulator-conductor composite that exhibits enhanced low frequency permittivity due to space charge effects.

5. The arrester of claim 1, wherein the frequency-dependent grading capacitor has a dielectric loss tangent that is less than 15% when the frequency of the voltage across the frequency-dependent capacitor is 60 Hz.

6. The arrester of claim 1, wherein the frequency-dependent grading capacitor has a dielectric loss tangent that is less than 5% when the frequency of the voltage across the frequency-dependent capacitor is 60 Hz.

7. The arrester of claim 1, wherein an impedance of the frequency-dependent grading capacitor is a first percentage of a total series impedance of the arrester when a frequency of a voltage across the frequency-dependent grading capacitor is at a first frequency; and wherein the impedance of the frequency-dependent grading capacitor increases to a second percentage of the total series impedance of the arrester when the frequency of the voltage across the frequency-dependent grading capacitor increases to a second frequency.

8. The arrester of claim 1, wherein an impedance of the frequency-dependent grading capacitor is less than 50% of a total series impedance of the arrester when a frequency of the voltage across the frequency-dependent grading capacitor is 60 Hz; and wherein the impedance of the frequency-dependent grading capacitor increases to at least 80% of the total series impedance of the arrester when the frequency of the voltage across the frequency-dependent grading capacitor increases to 30 kHz-1 MHz.

9. The arrester of claim 1, wherein one or more included MOV disc(s) are constructed from predominantly zinc oxide.

10. An accessory device electrically connected in series with an arrester, the accessory device comprising:

a spark gap assembly including:

a spark gap; and a frequency-dependent grading capacitor electrically connected in parallel with the spark gap, wherein a capacitance of frequency-dependent grading capacitor decreases as a frequency of a voltage across the frequency-dependent grading capacitor increases.

11. The accessory device of claim 10, wherein the frequency-dependent grading capacitor is constructed from a material including at least one of a donor-doped ferroelectric ceramic, a relaxor ferroelectric ceramic, and a conductor-insulator composite that exhibits enhanced low frequency permittivity due to space charge effects.

12. The accessory device of claim 10, wherein the capacitance of the frequency-dependent grading capacitor decreases by at least 40% when the frequency of the voltage across the frequency-dependent capacitor increases from 60 Hertz (Hz) to 500 kHz.

13. The accessory device of claim 10, wherein the capacitance of the frequency-dependent grading capacitor decreases by at least 75% when the frequency of the voltage across the frequency-dependent capacitor increases from 60 Hertz (Hz) to 500 KHz.

14. The accessory device of claim 10, wherein the frequency-dependent grading capacitor has a dielectric loss tangent that is less than 15% when the frequency of the voltage across the frequency-dependent capacitor is 60 Hz.

15. The accessory device of claim 10, wherein the frequency-dependent grading capacitor has a dielectric loss tangent that is less than 5% when the frequency of the voltage across the frequency-dependent capacitor is 60 Hz.

16. The accessory device of claim 10, wherein an impedance of the frequency-dependent grading capacitor is a first percentage of a combined series impedance of the frequency-dependent grading capacitor and the arrester when a frequency of a voltage across the frequency-dependent grading capacitor is at a first frequency; and wherein the impedance of the frequency-dependent grading capacitor increases to a second percentage of the combined series impedance of the frequency-dependent grading capacitor and the arrester when the frequency of the voltage across the frequency-dependent grading capacitor increases to a second frequency.

17. The accessory device of claim 16, wherein an impedance of the frequency-dependent grading capacitor is less than 50% of a combined series impedance of the frequency-dependent capacitor and the arrester when a frequency of the voltage across the frequency-dependent capacitor is 60 Hz.

18. The accessory device of claim 17, wherein an impedance of the frequency-dependent grading capacitor is at least 80% of a combined series impedance of the frequency-dependent capacitor and the arrester when a frequency of the voltage across the frequency-dependent capacitor is greater than 30 kHz.

* * * * *